United States Patent [19]

Hauser

[11] Patent Number: 5,740,701
[45] Date of Patent: Apr. 21, 1998

[54] WASHING MACHINE TRANSMISSION DRIVE CONNECTION

[75] Inventor: Hans Hauser, Strongsville, Ohio

[73] Assignee: MTD Products Inc., Cleveland, Ohio

[21] Appl. No.: 412,593

[22] Filed: Mar. 29, 1995

Related U.S. Application Data

[63] Continuation-in-part of Ser. No. 237,014, Apr. 29, 1994, Pat. No. 5,509,284.

[51] Int. Cl.$^6$ .............. D06F 23/04; F16H 21/18; F16H 19/04
[52] U.S. Cl. .............. 74/570; 68/23.2; 68/23.7; 74/32; 74/33; 74/573 R; 403/331
[58] Field of Search .............. 74/32, 33, 570, 74/571 L, 595, 573 R; 68/23.2, 23.7; 403/331, 381

[56] References Cited

U.S. PATENT DOCUMENTS

| | | | |
|---|---|---|---|
| 1,906,253 | 5/1933 | Engel | 74/571 L |
| 2,135,084 | 11/1938 | Kirby | 68/23 |
| 2,161,618 | 6/1939 | Dunham | 68/23 |
| 2,499,473 | 3/1950 | Elder | 74/76 |
| 2,511,978 | 6/1950 | Georgeff | 74/570 |
| 2,751,773 | 6/1956 | Woodson | 68/23 |
| 2,844,225 | 7/1958 | Hubbard | 188/82.4 |
| 2,946,409 | 7/1960 | Jennings | 188/134 |
| 2,976,746 | 3/1961 | Flannery | 74/665 |
| 3,046,772 | 7/1962 | Aberle | 68/12 |
| 3,115,218 | 12/1963 | Waldrop | 188/77 |
| 3,575,057 | 4/1971 | Kurowski | 74/30 |
| 3,779,090 | 12/1973 | Ostenberg | 74/81 |
| 3,783,652 | 1/1974 | Archbold | 68/23.7 |
| 3,838,755 | 10/1974 | Cochran | 188/166 |
| 3,845,642 | 11/1974 | Cochran | 68/23.7 |
| 3,869,157 | 3/1975 | Jolette | 403/225 |
| 3,899,933 | 8/1975 | Wright | 74/409 |
| 4,317,343 | 3/1982 | Gerry | 68/23.7 |
| 4,430,871 | 2/1984 | Brenner et al. | 68/23.7 X |
| 4,444,027 | 4/1984 | Ikeda | 68/23.6 |
| 4,886,297 | 12/1989 | Levine | 403/331 X |
| 5,033,278 | 7/1991 | Hossfield | 68/23.7 |
| 5,491,859 | 2/1996 | Richardson | 68/23.7 X |
| 5,509,284 | 4/1996 | Hauser | 68/23.7 |

FOREIGN PATENT DOCUMENTS

| | | | |
|---|---|---|---|
| 498035 | 8/1992 | European Pat. Off. | 403/381 |
| 1332113 | 6/1963 | France | 403/381 |

Primary Examiner—Allan D. Herrmann

[57] ABSTRACT

An eccentric gear for a transmission for a washing machine which uses an off center gear having a dual part construction combination with a rack and pinion mechanism, a brake clutch, and a drive clutch to provide the agitation and the high speed spin of the washing machine.

38 Claims, 4 Drawing Sheets

FIG-6

WASHING MACHINE TRANSMISSION DRIVE CONNECTION

This is a continuation-in-part of application Ser. No. 08/237,014 filed on Apr. 29, 1994, now Pat. No. 5,509,284.

FIELD OF THE INVENTION

This invention relates to an eccentric gear for a transmission for washing machines and, more particularly in the preferred embodiment, top loading washing machines.

BACKGROUND OF THE INVENTION

Washing machines have a transmission located immediately adjacent the tub. Typically, these transmissions produce a back and forth agitating movement of an agitator for rotation of the washing machines motor in one direction, with a continuous direct spin of the tub being produced upon the rotation of the motor in an opposite direction. The transmission thus provides a dual state operation depending upon the direction of rotation of the motor for the machine. Typically, these transmissions are relatively large and heavy designs having cast iron housings and complicated interconnections between parts in order to provide for the agitation movement. The Franklin and Whirlpool units are typical of these designs.

OBJECTS AND SUMMARY OF THE INVENTION

It is an object of the present invention to provide for a low cost eccentric gear for a transmission.

It is another object of the present invention to simplify the construction of transmissions.

It is yet another object of the present invention to lower the physical size and weight of transmissions.

It is still another object of the present invention to reduce the cost of eccentric gears of transmissions.

It is a further object of the present invention to lower to cost and size of the associated washing machine.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

The eccentric gear of this invention is designed for use with a washing machine transmission. The washing machine includes a motor and a tub. These are found in representational form in FIG. 5 as items 8 and 9, respectively.

Figure 5:
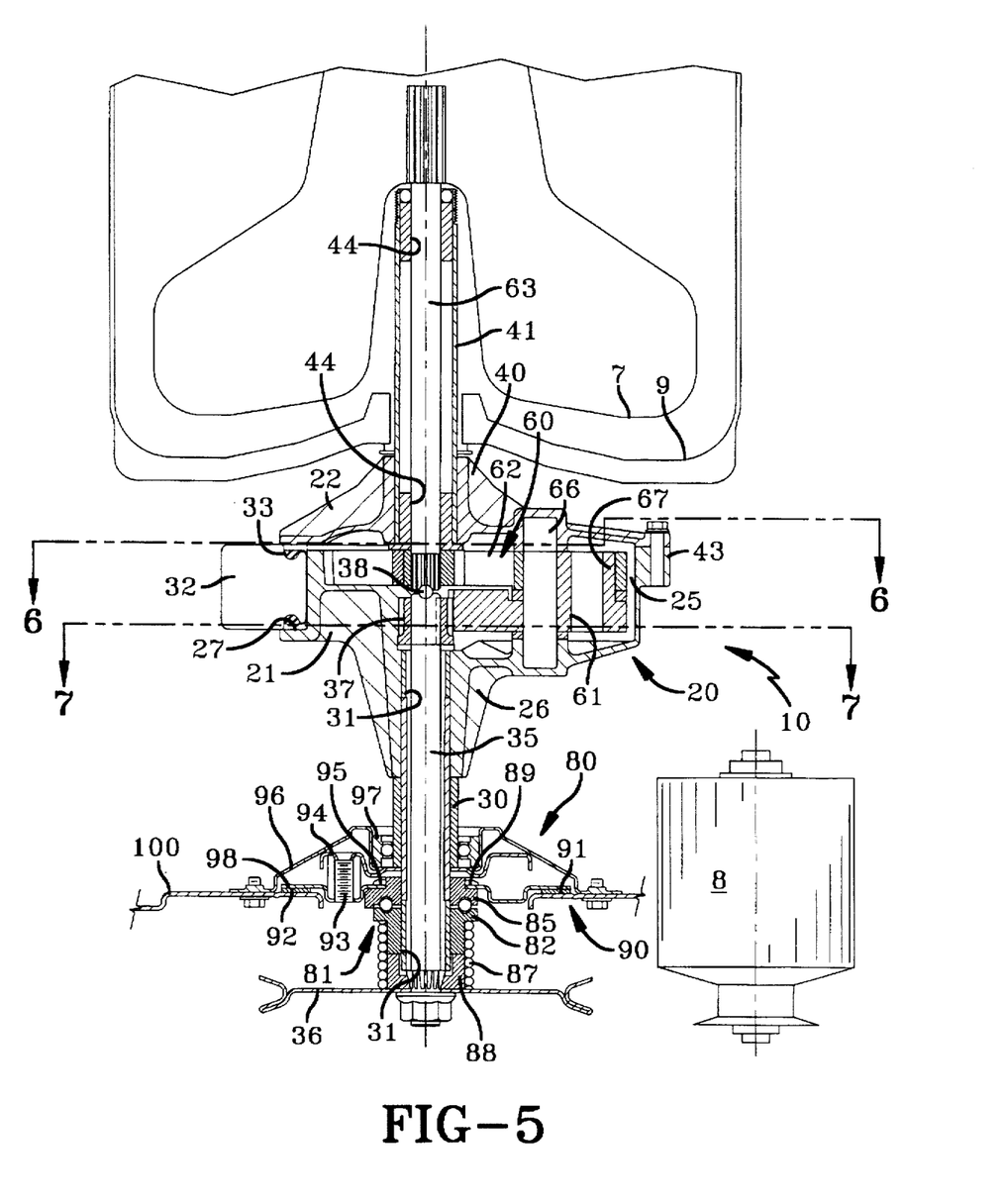
FIG. 5 is a longitudinal cross section view of the assembled transmission of FIG. 1.

The motor 8 is capable of bidirectional rotation, the direction of rotation depending upon the allied washing machine control system in the customary manner. Upon rotation of this motor 8 in one direction, a transmission 10 produces back and forth angular agitation of an agitator 7. With rotation of the motor 8 in the opposite direction, the transmission 10 causes spinning of the tub 9. This dual control action is produced by the transmission 10 for the washing machine. Some motors also provide variable speeds in addition to directional control so as to vary the duty cycle. Again, this duty cycle is under the control of the allied washing machine control system.

The transmission 10 of this invention includes a housing 20, an agitation system 60, and an activating system 80.

The housing 20 serves to contain the physical elements of the transmission 10. The preferred housing disclosed includes a lower housing 21 and an upper housing 22.

The lower housing 21 is a deep drawn casting, preferably a low density material such as aluminum, having a cavity 25 sufficient to contain the physical parts of the transmission. The lower housing 21 in addition preferably includes an integral longitudinal extension 26 on the opposite side of the cavity 25 to provide an extended bearing support. The lower housing 21 also includes a sideways extending lateral cutout 27 for localizing a counterweight 32 (later described). An input tube 30 fixedly connected or integral to the extension 26 provides an interconnection between the frame 100 of the washing machine, the housing 20 and later described clutch system 60. Two bearings 31 are included on the inside of the input tube 30 for rotatively supporting a later described input shaft 35.

The high mass counterweight 32 is located in the cutout 27 with rubber isolator 33 retaining the counterweight 32 in location. This counterweight 32 is designed to counter balance the otherwise weight uncompensated for parts of the housing 20 and agitation system 60 (for example the eccentric gear 61). Without this counterweight 32, a vast increase in size and complexity of design for the other parts of the transmission 10 would be necessary to provide for a smooth balanced spinning of the wash tub 9.

In the preferred embodiment disclosed, the lower housing 21 is also made of a low density material, aluminum, while the counterweight 32 is made of a higher density material, steel (weight 720 grams). This allows for a more effective use the mass of the counterweight 32 than would be possible with similar density materials. Also, the location of the center of mass of the counterweight 32 at a significant distance from the rotational axis of the transmission 10 further increases its effectiveness regarding lesser distances. In this respect, also note that in the preferred embodiment the center of mass of the counterweight 32 is located approximately 50% further outward from the rotational axis of the transmission 10 than the center of mass of the furthest item out needing compensation (the eccentric gear 61 which has its center of mass substantially coextensive with an idler shaft 66). This further increases the effectiveness of the counterweight.

The input shaft 35 is rotatively mounted in respect to the lower housing 21 by the bearings 31. This input shaft 35 is axially in line with the later described agitator shaft 63. This simplifies and strengthens the support of the housing 20 to the frame of the washing machine as well as allied drive parts including the tub 9.

A ball 38 between the upper end of the input shaft 35 and the lower end of the agitator shaft 63 locates both such shafts axially in position as well as providing for a thrust bearing for the later described agitator. As the ball 38 rotates and spins during the operation of the device, wear is spread out evenly over the full outer surface of such ball 38.

A pulley 36 is fixedly connected to the lower end of the input shaft 35 for supplying power between the motor 8 and the input shaft 35. The sizing of the pulley 36 allows for a reduction in relative speed between the motor 8 and the input shaft 35. An input pinion 37 is splined on the other end of the input shaft 35 for drivingly connecting the input shaft 35 with the later described eccentric gear 61.

The upper housing 22 completes the housing 20. The upper housing 22 consists of a low profile closure member 40 and an agitator tube 41. When the upper housing 22 is bolted to the lower housing 21 by bolts 42 with the seal 43 therebetween, the housing is complete. Two additional bearings 44 rotatively support the later described agitator shaft 63 in the agitator tube 41 of the upper housing 22. Again, the upper housing 22 is preferably made of a low density material such as aluminum so as to increase the effectiveness of the counterweight 32. As the agitation shaft 63 is in line with the input shaft 35, any inherent rotary imbalance is eliminated. The careful design techniques, for example the counterweight 32, further reduce any imbalance.

The agitation system 60 is the mechanism which alters the constant unidirectional rotation of the pulley 36 into a differing direction, a back and forth movement, of the cleansing agitator 7 in the tub 9, thus providing the necessary cleansing movement for the clothes therein. The preferred agitation system 60 disclosed includes an eccentric gear 61, an agitator rack 62, and an agitator shaft 63.

The eccentric gear 61 is rotatively mounted to the housing 20 by an idler shaft 66 which is located extending between holes in the lower housing 21 and the upper housing 22. The eccentric gear 61 shown is directly rotated by the input pinion 37 which extends off of the end of the input shaft 35. The particular input pinion 37 eccentric gear 61 gear ratio has an approximate four to one reduction, a reduction significantly lower than customary in washing machine transmissions.

A bearing piece 67 that is preferably circular in cross section with a radius R1 extends off of one side of the eccentric gear 61. The bearing piece 67 has a circumferential edge 68. The center 77 of the bearing piece 67 is displaced from the center 79 of the eccentric gear 61. The side of the bearing piece 67 has a hole or recesses through it and the rest of the axial depth of the eccentric gear 61 in order to reduce side to side imbalance forces during rotation (later described).

In the preferred embodiment of the invention, the eccentric gear 61 is the main part of the transmission 10 that is located off center of the longitudinal axis of such transmission 10. Indeed, in the embodiment shown, the eccentric gear 61 is displaced totally from such axis. For this reason, it is important that this eccentric gear 61 be as light as possible within the limits of the strength required for this critical part: This lightness would reduce the unbalancing of the transmission 10 on the rotation thereof. This in turn reduces the mass of the balancing counterweight 32 as well as the overall size and mass of the transmission 10.

In the preferred embodiment of FIGS. 1–4, this lightness is provided by utilizing two joined parts, a web portion 110 and a circumferential drive portion 120.

Figure 2:
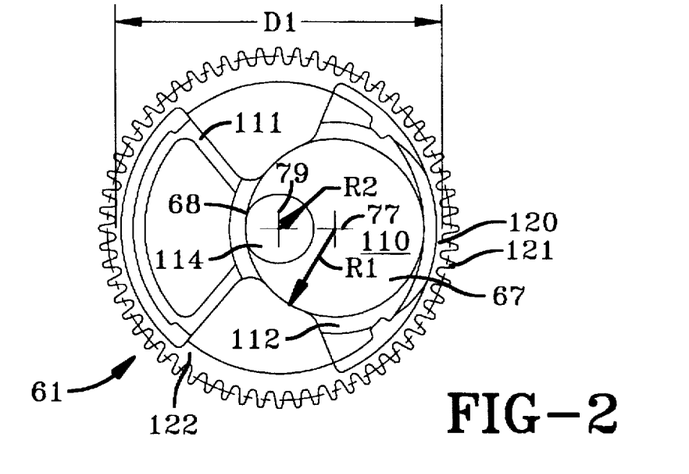
FIG. 2 is an enlarged top view of the eccentric gear of FIG. 1.
Figure 3:
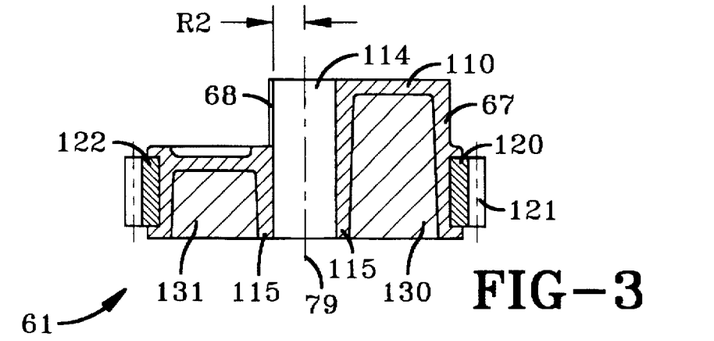
FIG. 3 is a cross sectional view of the eccentric gear taken along the line 3—3 of FIG. 4.
Figure 4:
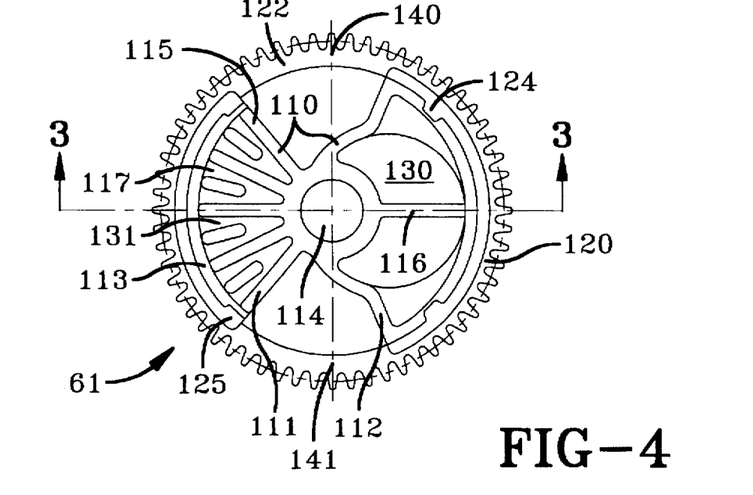
FIG. 4 is a bottom view of the eccentric gear of FIG. 2.

The web portion 110 is designed to physically support the eccentric gear 61 to the idler shaft 66 as well as forming the bearing piece 67. The web portion 110 shown is a die cast piece including first and second substantially triangular pieces 111, 112 located symmetrically opposed off of an idler shaft hole 114. As seen in FIG. 2, the idler shaft hole 114 is circular with a radius R2 and is concentric with the eccentric gear 61. Thus, the center 77 of the bearing piece 67 is displaced from the center 79 of the eccentric gear 61 by a distance equal to the radius R1 of the bearing piece 67 minus the radius R2 of the idler shaft hole 114. The second triangular piece 112 has the bearing piece 67 integrally formed extending upwards off of the top thereof. It can be seen in FIG. 2 that the first triangular piece 111 and the extended bearing piece 67 are located on opposite sides of the center 79 of the eccentric gear 61. First and second large upwardly extending cavities 130, 131 are surrounded by substantially uniform thickness thin walls 115 (about ⅛") and a central stiffening rib 116. The first cavity 130 in the eccentric gear 61 is located under the bearing piece 67 and preferably extends into the bearing piece 67. As seen in FIG. 3, both first and second cavities 130, 131 are spaced from the center 79 of the eccentric gear 61. Note that due to the fact that the idler shaft hole 114 extends to the outer surface of the bearing piece 67, the entire part can be made smaller for a given bearing piece. This also reduces the physical size of the transmission 10 by eliminating the concomitant need to increase the sizing of other parts. The first triangular piece 111 also has a number of cavities 117. These cavities 117 are designed to lighten the first triangular piece 112 so as to substantially equalize its mass to that of the second triangular piece 112. This rotatively balances the eccentric gear 61. Thus, it can be appreciated that the first triangular piece 111 functions as a balancing section 113 for the eccentric gear 61. Due to the limited forces on the web portion 110, this portion can be made of relatively low density powder metal.

The circumferential drive portion 120 is designed to drivingly interconnect the eccentric gear 61 to the input pinion 37. The particular preferred circumferential portion 120 is thus a circular gear 121 having gear teeth with a minor diameter D1 about a rim 122. As best seen in FIG. 2, the circumferential edge 68 of the bearing piece 67 is located within the minor diameter. This circular gear 121 is fixedly joined to the web portion 110 by first and second circumferentially extending tab slots 124, 125. This holds the parts together as well as angularly supporting the first and second triangular pieces 111, 112 of the web portion 110. The rim 122 is made of high density powder metal, some ¼" wide and ⅝" high.

Due to the separation of the web portion 110 from the drive portion 120, both parts can thus be optimized in a light weight unit, a unit some 50% of the weight of a purely cast eccentric gear 61. This allows for a lower weight counterweight, thus aligning the center of mass of these two parts closer to the longitudinal axis of the transmission 10. The concentration of forces between the input pinion 37 and the eccentric gear 61 is dependent on the angular positioning of the bearing piece 67, with the highest loading occurring when the bearing piece 67 is mid- stroke (i.e., at the time when the speed of the agitator rack 62 highest). By selectively hardening first and second points 140, 141 on the circumferential drive portion 120 the eccentric gear 61 would perform as if it was made of higher density materials. This lowers the cost and weight of the part.

Figure 6:
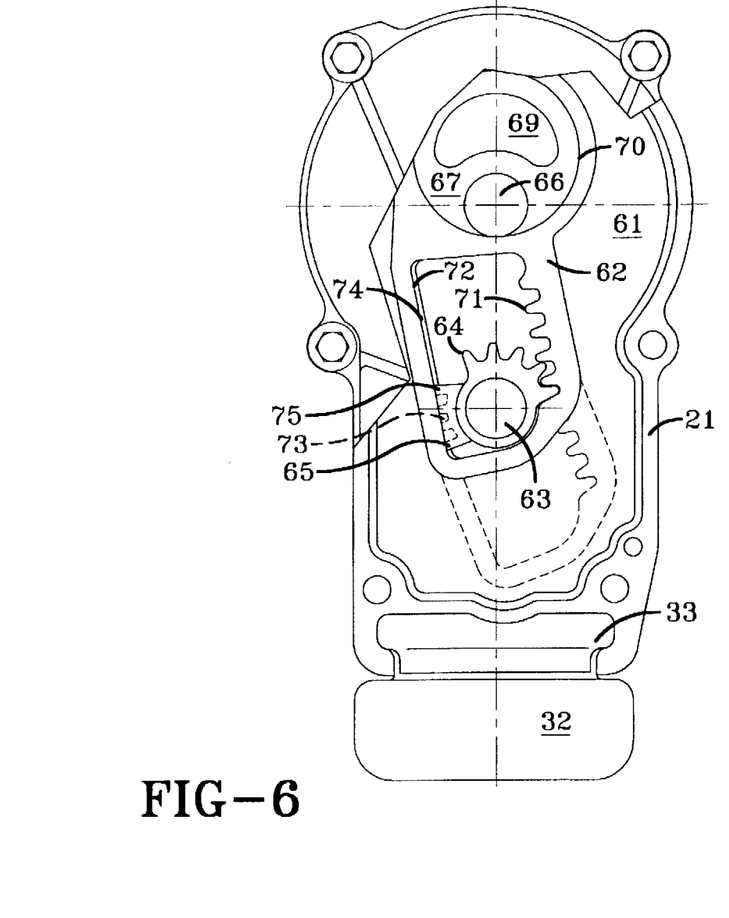
FIG. 6 is a lateral cross sectional view of the transmission taken substantially along lines 6—6 in FIG. 5; and, FIG. 7 is a second lateral cross sectional view of the transmission taken substantially along lines 7—7 in FIG. 5 without counterweight.
Figure 7:
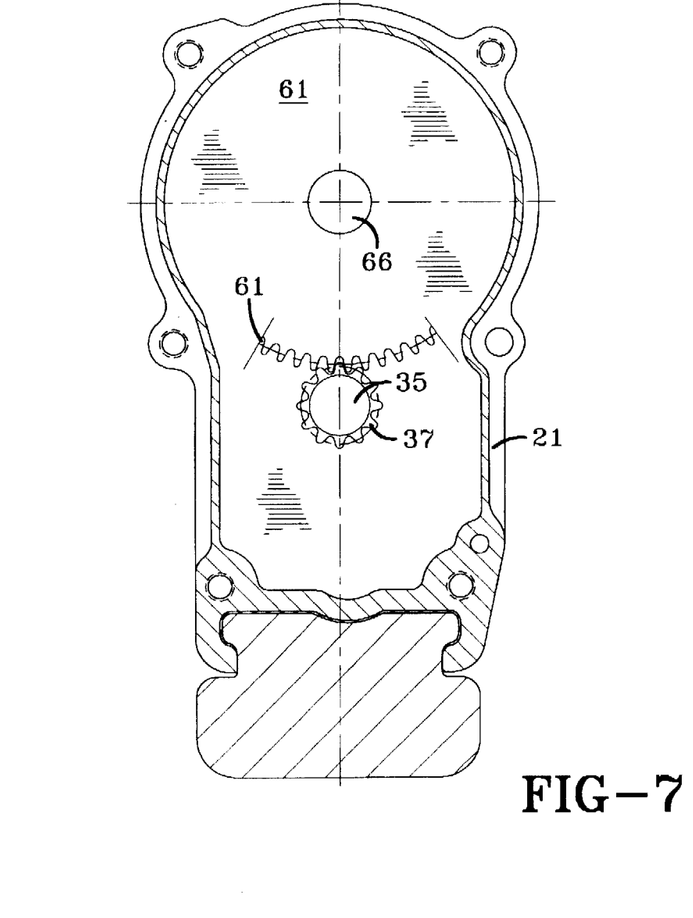

The agitator rack 62 has a circular bearing 70 and a cavity with teeth 71 (FIG. 6). The circular bearing 70 of the agitator rack 62 is located around the bearing piece 67 of the eccentric gear 61 with the toothed head 64 of the agitator shaft 63 in driving contact with the teeth 71 of the rack 62.

The cavity with teeth 71 is laterally offset in respect to the circular bearing 70. This reduces vibration by locating the longitudinal power transferring axis of the rack of teeth 71 in line with the central rotational axis of the circular bearing 70 (and shaft 66). This is preferred. A small bearing pad 65 extends between the non-toothed section of the head 64 of the agitator shaft 63 so as to bear on the flat surface 74 of the cavity in the rack 62 on the opposite side as the teeth 71. This bearing pad 65 has longitudinal slots (dotted lines 73 in FIG. 6) molded into the bottom thereof in order to provide for uniform wall thickness and thus improve cooling. The bearing pad 65 further has a slight lip 75 formed extending off of the top thereof. This lip 75 cooperates with a small groove 72 formed in the top surface of the rack 62 to support the bearing pad 65 in position. Other means such as a groove in the toothed end of the agitator shaft with corresponding lip for the bearing piece 65, a washer above pinion 37, etc. could also be used to hold this bearing pad 65 in axial position.

The agitator shaft 63 itself is supported by bearings 44 to the agitator tube 41 of the housing 20. The longitudinal rotational axis of the agitator shaft 63 is in line with the longitudinal rotational axis of the input shaft 35. This allows the use of a simple ball thrust bearing ball 38 as well as simplifying the construction of the remainder of the washing machine.

During agitation, the housing 20 is fixedly connected to the frame 100 of the washing machine (by the later described disc brake assembly 90). This forces the input shaft 35 to rotate in respect to the housing 20. This in turn causes the eccentric gear 61 to rotate. As the eccentric bearing piece 67 has a central rotational axis offset from that of the eccentric gear 61, any rotation of the eccentric gear 61 causes the agitator rack 62 to move back and forth with a reciprocating reversing movement for a limited longitudinal extent. As the teeth 71 of the rack 62 are in driving engagement with the toothed head 64 of the agitator shaft 63, this mechanism translates the pure rotation of the input shaft 35 into a back and forth limited reversing rotational movement of the agitator shaft 63 (about 150° in the embodiment shown). This transformation is facilitated by the use of the bearing pad 65 between the toothed head 64 and the flat surface 74 of the rack. The reason for this is that the bearing pad 65 spreads out the force from the toothed head 64 over a larger surface than otherwise possible (without the bearing pad 65, there would be direct linear contact between the toothed head 64 and the flat surface 74, thus concentrating the forces in a very small area). This increases wear and reduces durability of the transmission. The bearing pad 65 reduces friction and wear between the agitator rack 62 and the agitator shaft 63.

Due to the use of the preferred design, the amount of mass shifting in the transmission 10 is reduced relative to other systems. For example as can be seen in FIG. 6, most of the side to side shifting is caused by the bearing piece 67 of the eccentric gear 61 and the circular bearing 70 of the agitator rack. Due to the holes and recesses in the bearing piece 67 and the narrow width of the circular bearing 70, the effective mass of both of these parts are minimized. This in combination with the high effectiveness of the mass of the counterweight 32 and the eccentric gear 61 (as previously described) reduces off balance rotation. This is particularly so when one considers the effective mass of the damp clothes in the washing tub during any spin cycle. The designed in parameters thus lower vibration relative to competitive designs.

The operative condition, agitation, or rotation of the transmission 10 is produced by an activating system 80. This activating system 80 includes a means of tying the input pulley 36 directly to the housing 20 so as to transfer 100% of the rotation of the pulley 36 to such housing 20. This causes spinning of the tub 9. A means to interconnect the housing 20 to the fixed relatively immovable position frame 100 of the washing machine is also included so as to lock the housing 20 into position in respect thereto. This activates agitation by providing a reaction lock for the agitation system. As later described, the selective operation of one or the other of these means produces the two operative conditions for the transmission 10.

In the unpowered condition of the transmission 10, the default condition is the fixing of the housing 20 to the frame 100 of the washing machine by the later described brake assembly 90. (This condition is produced by the force of three springs 93 acting downwardly on a brake disc 91 so as to engage it with a brake surface 92 of the frame 100.) This operative condition of the transmission 10 remains in effect on rotation of the pulley 36 into an agitation direction. At this time, the brake assembly 90 provides a reaction member for the agitation.

On rotation of the pulley 36 in a spin direction, the brake assembly 90 is released and the housing 20 tied to the pulley 36 for common rotation. This operative condition of the transmission 10 remains in effect on continuation of rotation of the pulley 36 in a spin direction, reverting to a default condition on cessation of such rotation.

Figure 1:
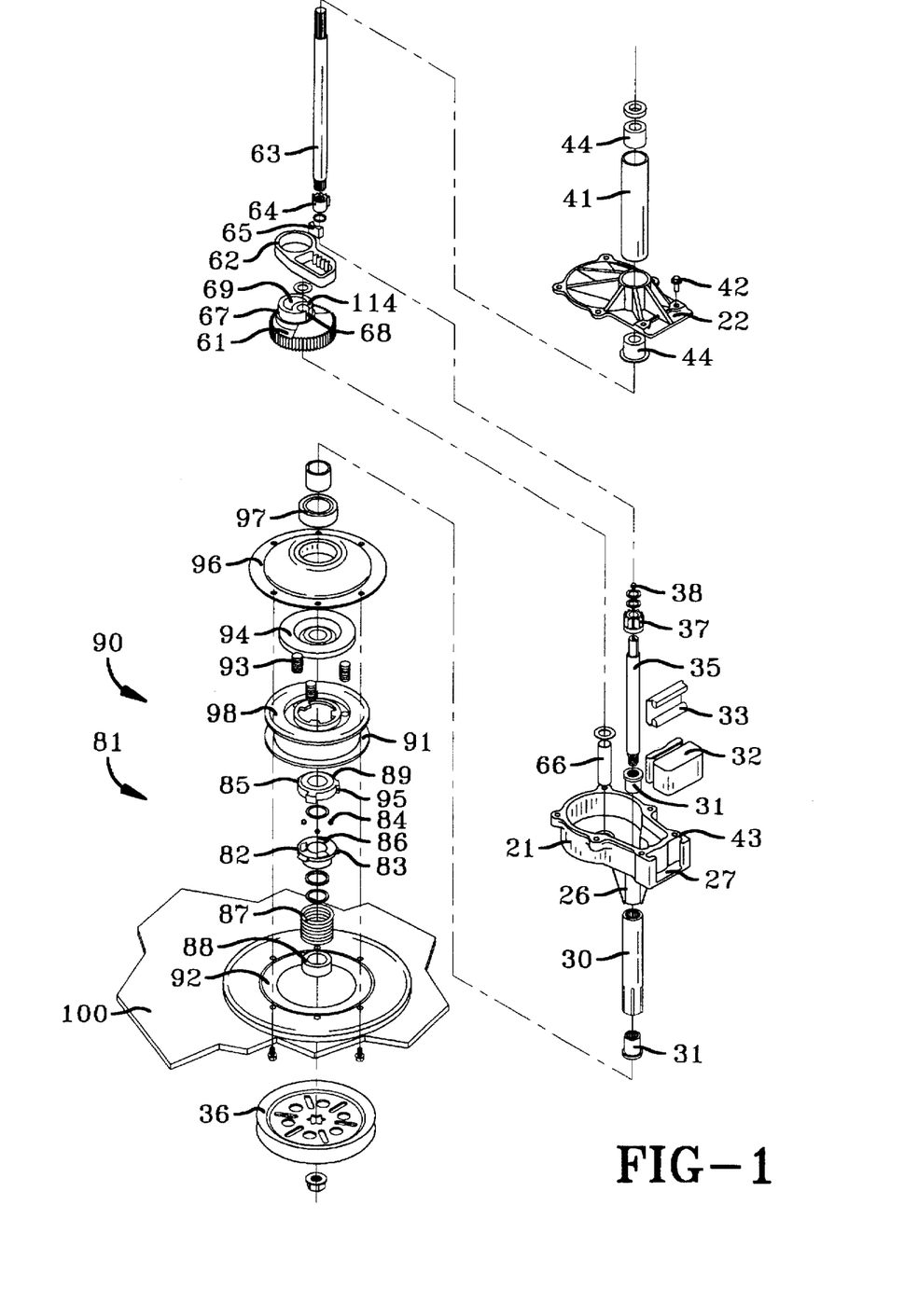
FIG. 1 is a perspective view of a disassembled transmission incorporating the invention of the application.

In the embodiment disclosed in FIG. 1, the two conditions are provided by an inclined ramp clutch assembly 81 and a large disc brake 91. The particular clutch assembly 81 disclosed provides for the rotation connection as well as deactivating the disc brake 91. It thus is part of both means.

The inclined ramp clutch assembly 81 includes an actuation member 82, a reaction member 85, a pulley hub 88, and a clutch spring 87.

The pulley hub 88 is fixedly connected to the input pulley 36 for rotation therewith in either direction. This pulley hub 88 has, at its outer circumference, a unidirectional spiral wound clutch spring 87 surrounding it. This clutch spring 87 is spiral wound so as to allow free rotation of the pulley hub 88 in one direction of rotation while locking the pulley hub 88 to the actuation member 82 for rotation therewith on rotation in the other direction.

The actuation member 82 includes on its upper surface three inclined ramp pockets 86. The reaction member 85 is located immediately above the actuation member 82 with an internal sleeve bearing to the tube 30 of the lower housing 21. Three pockets (not shown) mirror image to those in the agitation member 82 are formed in the lower surface of the reaction member 85. Note that it is preferred that both these ramp pockets have a reduced (or even flat) incline at their shallowest ends. The reason for this is while the initial spin torque might be high (50 pounds for example), the continuing spin torque can be a fraction of this (ten pounds for example). As in the preferred embodiment disclosed, there is a substantially 180 pound spring force from the disc brake springs 93, the use of the reduction in incline is utilized to maintain the brake in deactivated condition even during a severe torque drop as long as the pulley 36 continues to be rotated by the motor in a spin direction. In addition, the reduction in incline also aids when there are torque load variations at a given level (unbalanced loads for example).

Three actuation balls 84 are captured between the ramp of the actuation member 82 and the pockets of the reaction member 85. These balls 84 act to separate the actuation member 82 from the reaction member 85 on the relative rotation therebetween.

There are a set of overlapping tabs 95, 83 respectively extending off of the edges of the reaction member 85 and actuation member 82 respectively. These two tabs 95, 83 are designed to solidly drivingly interconnect the actuation member 82 to the reaction member 85 at or slightly before the balls 84 contact the shallow end between such members.

With this orientation, relative rotation between the actuation member 82 and reaction member 85 in one direction moves the reaction member 85 first upwards (via the spring 87 and the balls 84 against the springs 93) and then ties the reaction member 85 to the actuation member 82 (via the tabs 95-83) for rotation therewith. As the reaction member 85 is in turn solidly connected to the housing 20 (via its toothed inner surface to the lower end of the tube 30 of the lower housing), this rotation of the reaction member 85 also serves to tie the pulley 36 to the housing 20 for common rotation (i.e., spin cycle).

The disc brake 91 is deactivated by the upwards movement of the reaction member 85. The reason for this is the reaction member 85 is fixedly interconnected to the disc 91 of the disc brake assembly 90 for common upwards movement, accomplishing this by the top of the toothed outer surface 89 pushing against member 98. Thus the brake is deactivated as the actuation member 82 rotates in respect to the reaction member 85.

As rotation of the operative actuation member 82 is provided by the clutch spring 87 interconnection to the pulley hub 88 caused by rotation of the pulley 36 in one direction, the operative condition of the inclined ramp clutch assembly 81 is thus dependent on the direction of rotation of the motor 8.

The activation of the disc brake 91 serves as the means to cause agitation to occur. This will occur if the motor 8 revolves in an agitation direction. The reason for this is the operation of the disc brake assembly 90.

The disc brake assembly 90 disclosed includes a brake disc 91, a brake ring 92, a spring 93, and a reaction member 94.

The brake disc 91 itself is a flat circular member having a brake surface at its outer lower edge. The inside opening of this brake disc 91 is, as previously discussed, interengaged with the toothed outer surface 89 of the reaction member 85 (through part 98) so as to lock the brake disc 91 to tie such disc 91 to such member 85 for rotation and upward motion therewith. A support member 94 extends between the lower part of the housing 20 to a location adjacent to the upper surface of the brake disc 91 to bias same into braking condition with the frame 100 via the springs 93 between the brake disc 91 and the support member 94. These springs 93 serve to bias the brake disc 91 into an actuated or braked position against the brake ring 92 (180 pounds spring force in the disclosed embodiment). The brake ring 92 is itself fixedly connected to the stationary frame 100 of the washing machine.

As the brake disc 91 is fixedly connected to the housing 20 for rotation therewith in its spring loaded default condition, this serves to lock the washing machine tub 9 (via a disc 91) into a default braked condition preventing the rotation thereof. This activates the agitation mechanism of the transmission.

The inside of the brake disc 91 is positioned next to the upper surface of the reaction member 85 such that upward movement of this reaction member 85 causes the brake disc 91 to move upwards against the force of the spring 93 and thus release the brake. In the embodiment shown, the disc brake assembly 90 is located adjacent to the main lower bearing support 96, a fixed part of the washing machine frame, immediately adjacent to the main lower bearing 97.

The ramp assembly 81 and brake assembly 90 are activated by the direction of rotation of the input shaft 35.

Upon rotation of the input shaft 35 and the pulley hub 88 in one direction, the clutch spring 87 is not activated and the actuation balls 84 are located and remain at the lower ends of their ramps in the actuation member 82 and their reaction member 85. This allows the disc brake 91 to continue to contact the brake ring 92, thus holding the lower housing 21 in a position of non-rotation. This provides a reaction member for the previously described agitation system.

On rotation of the input shaft 35 and the pulley hub 88 in the opposite direction, the clutch spring 87 is activated tying the actuation member 82 to the pulley hub 88 for common rotation. This in turn forces the actuation balls 84 to be moved to the high ends of their respective ramps in the actuation member 82 and the reaction member 85. This causes the reaction member 85 to move in an upwards direction. As the brake disc 91 is located immediately adjacent to the outer surface 89 of the reaction member 85, this movement also forces the disc brake 91 upwards against the force of the springs 93 to move away from the brake ring 92. This releases the brake. When the tabs 83, 95 subsequently contact, the tabs serve to tie the actuation member 82 to the reaction member 85 for rotation therewith. This in turn ties the input shaft 35 to the housing 20 for rotation therewith causing spinning of the tub 9. Therefore, as long as the pulley 36 (and the shaft 35) continue to rotate in a single direction, the tub 9 continues to rotate with the shaft. This continues spinning of the tub 9.

On cessation of rotation of the input shaft 35, the activation mechanism reverts to its default braked condition. This is facilitated by the inertial qualities of the rapidly spinning tub 9 which causes the reaction member 85 to move faster than the actuation member 82, forcing the balls 84 downwards to the low ends of their ramps thus reactivating the brake 90. The incline of the respective pockets facilitates this return to braking condition.

Upon resetting of the brake to its default condition, rotation of the shaft in the first direction will cause agitation of agitator 7, with reverse rotation again spinning the tub 9.

Modifications of this agitation/spin activation system are possible. For example, the two operative conditions are provided by a relative clutch and a relative brake with the activation occurring depending on the direction of rotation of the pulley 36 in one direction activating the clutch with rotation in a second direction actuating the brake. Other means of accomplishing this could be provided.

Although the invention has been described in its preferred embodiment with a certain degree of particularity, it is to be understood that numerous changes can be made without deviating from the invention as hereinafter claimed.

What is claimed:

1. An eccentric gear having a center for use with a washing machine transmission, said eccentric gear comprising;

an extended bearing piece having a circumferential edge, said eccentric gear being rotatively supported to the washing machine transmission by an associated shaft having a radius, said circumferential edge of said bearing piece being displaced from said center of said eccentric gear by a distance substantially equal to the radius of the associated shaft.

2. The eccentric gear of claim 1 further comprising:

a circular gear having teeth with a minor diameter, said circumferential edge of said extended bearing piece being located within said minor diameter of said teeth.

3. The eccentric gear of claim 1 wherein the associated shaft extends through said extended bearing piece.

4. The eccentric gear of claim 1 wherein said eccentric gear has a first cavity, said first cavity being located under said extended bearing piece.

5. The eccentric gear of claim 4 wherein said first cavity extends into said extended bearing piece.

6. The eccentric gear of claim 1 further comprising:
   a balancing section, said balancing section and said extended bearing piece being located on opposite sides of said center of said eccentric gear.

7. The eccentric gear of claim 1 wherein the washing machine transmission has a rotation axis, said eccentric gear being located off center with respect to said rotational axis.

8. The eccentric gear of claim 7 wherein said eccentric gear is displaced totally from said rotational axis.

9. The eccentric gear of claim 1 further comprising:
   a web portion, said web portion forming said extended bearing piece;
   a circumferential drive portion having outer gear teeth, said outer gear teeth surrounding said circumferential drive portion; and,
   joining means to fixedly join said web portion to said circumferential drive portion.

10. The eccentric gear of claim 9 wherein said eccentric gear has a first cavity located in said web portion.

11. The eccentric gear of claim 10 wherein said web portion comprises:
    first and second substantially triangular pieces.

12. The eccentric gear of claim 9 wherein said web portion comprises:
    walls of substantially uniform thickness.

13. The eccentric gear of claim 1 further comprising:
    hardening means for selectively hardening a first point on said eccentric gear, said first point allowing said eccentric gear to perform as if it was made of a higher density material.

14. The eccentric gear of claim 1 wherein the washing machine transmission comprises:
    an agitator rack having a circular bearing and a cavity, said circular bearing being located around said extended bearing piece, said cavity of said agitator rack being laterally offset from said circular bearing.

15. The eccentric gear of claim 14 wherein said circular bearing of said agitator rack has a central rotational axis and said cavity of said agitator rack has teeth with a longitudinal power transferring axis, said power transferring axis of said teeth being in line with said central rotational axis of said circular bearing.

16. The eccentric gear of claim 14 wherein the washing machine transmission further comprises:
    an agitator shaft, said agitator shaft being located within said cavity of said agitator rack; and,
    a bearing pad, said bearing pad being located within said cavity of said agitator rack, said bearing pad being located between said agitator shaft and a flat surface of said agitator rack.

17. An eccentric gear having a center for use with a washing machine transmission, said eccentric gear comprising:
    an extended bearing piece, said extended bearing piece having a circumferential edge, a radius R1, and a center, said eccentric gear having an idler shaft hole extending through said eccentric gear down the center thereof, said idler shaft hole having a radius R2, an associated idler shaft extending in said idler shaft hole to rotatively support said eccentric gear to the washing machine transmission, said center of said extended bearing piece being displaced from said center of said eccentric gear by a distance substantially equal to said radius R1 of said extended bearing piece minus said radius R2 of said idler shaft hole.

18. The eccentric gear of claim 17 further comprising:
    a circular gear having teeth with a minor diameter, said circumferential edge of said extended bearing piece being located within said minor diameter of said teeth.

19. The eccentric gear of claim 17 wherein said eccentric gear has a first cavity extending axially therethrough, said first cavity extending into said extended bearing piece, said first cavity being spaced from said center of said eccentric gear.

20. The eccentric gear of claim 19 wherein said first cavity is surrounded by a wall of substantially uniform thickness.

21. An eccentric gear for use with a washing machine transmission, said eccentric gear comprising:
    a web portion, said web portion forming an extended bearing piece;
    a circumferential drive portion having outer gear teeth, said outer gear teeth surrounding said circumferential drive portion and said web portion; and,
    joining means to fixedly join said web portion to said circumferential drive portion.

22. The eccentric gear of claim 21 wherein said eccentric gear has a first cavity, said first cavity being in said web portion.

23. The eccentric gear of claim 21 wherein said outer gear teeth of said circumferential drive portion have a minor diameter and said extended bearing piece has a circumferential edge, said extended bearing piece being located within said minor diameter of said teeth.

24. The eccentric gear of claim 21 wherein said eccentric gear is rotatively supported to the washing machine transmission by an associated shaft that extends through said extended bearing piece.

25. The eccentric gear of claim 21 wherein said eccentric gear has a center, said eccentric gear further comprising:
    a balancing section, said balancing section and said extended bearing piece being located on opposite sides of said center of said eccentric gear.

26. The eccentric gear of claim 24 wherein the washing machine transmission has a rotation axis, said eccentric gear being located off center with respect to said rotational axis.

27. The eccentric gear of claim 15 wherein said eccentric gear is displaced totally from said rotational axis.

28. The eccentric gear of claim 21 wherein said web portion comprises:
    first and second substantially triangular pieces.

29. The eccentric gear of claim 21 wherein said web portion comprises:
    walls of substantially uniform thickness.

30. The eccentric gear of claim 21 further comprising:
    hardening means for selectively hardening a first point on said eccentric gear, said first point allowing said eccentric gear to perform as if it was made of a higher density material.

31. The eccentric gear of claim 21 wherein the washing machine transmission comprises:
    an agitator rack having a circular bearing and a cavity, said circular bearing being located around said extended bearing piece, said cavity of said agitator rack being laterally offset from said circular bearing.

32. The eccentric gear of claim 31 wherein said circular bearing of said agitator rack has a central rotational axis and said cavity of said agitator rack has teeth with a longitudinal power transferring axis, said power transferring axis of said teeth being in line with said central rotational axis of said circular bearing.

33. The eccentric gear of claim 32 wherein the washing machine transmission further comprises:

an agitator shaft, said agitator shaft being located within said cavity of said agitator rack; and, a bearing pad, said bearing pad being located within said cavity of said agitator rack, said bearing pad being located between said agitator shaft and a flat surface of said agitator rack.

34. A washing machine transmission comprising:

a rotational housing with a weight uncompensated for part being spaced from a rotational axis of said rotational housing;

a counterweight formed of higher density material than said rotational housing; and, affixing means to affix said counterweight to said rotational housing with said counterweight on an opposite side of said rotational axis from said weight uncompensated for part.

35. The washing machine transmission of claim 34 wherein said affixing means includes a resilient isolator.

36. The washing machine transmission of claim 34 wherein said affixing means includes a lateral cutout in said rotational housing.

37. The washing machine transmission of claim 34 wherein said weight uncompensated for part and said counterweight each have a center of mass, said center of mass of said counterweight being located substantially 50% farther from said rotational axis of said rotational housing than said center of mass of said weight uncompensated for part.

38. The washing machine transmission of claim 37 wherein said weight uncompensated for part is an eccentric gear, said eccentric gear being displaced totally from said rotational axis.

* * * * *